United States Patent [19]

Plischke et al.

[11] Patent Number: 4,851,466

[45] Date of Patent: Jul. 25, 1989

[54] PROCESS FOR PREPARING HEAT AND LIGHT STABILIZED NYLON 66 POLYMER

[75] Inventors: Lemoyne W. Plischke, Lillian, Ala.; Donald E. Danly, Pensacola, Fla.

[73] Assignee: Monsanto Company, St. Louis, Mo.

[21] Appl. No.: 289,143

[22] Filed: Dec. 23, 1988

[51] Int. Cl.$^4$ ................................................ C08K 3/28
[52] U.S. Cl. ...................................... 524/413; 524/401; 524/606; 524/781; 528/336
[58] Field of Search ............... 524/413, 401, 436, 781, 524/779, 606, 608; 528/319, 336

[56] References Cited

U.S. PATENT DOCUMENTS

| | | | |
|---|---|---|---|
| 2,705,227 | 3/1955 | Stamatoff | 524/781 |
| 2,960,489 | 11/1960 | Gabler et al. | 528/336 |
| 3,280,053 | 10/1966 | Twilley et al. | 524/781 |
| 3,313,769 | 4/1967 | Maahs et al. | 528/319 |
| 3,318,827 | 5/1967 | Whittaker | 524/413 |
| 3,431,236 | 3/1969 | Davenport et al. | 528/336 |
| 3,491,042 | 1/1970 | Hermann et al. | 524/413 |

*Primary Examiner*—Veronica P. Hoke
*Attorney, Agent, or Firm*—John W. Whisler

[57] ABSTRACT

Nylon 66 polymer is stabilized against heat and light during its preparation by conducting the polymerization in the presence of certain copper complexes, such as cupric amminohydroxide, and KBr and/or KI. Less metallic copper is formed during polymerization than if copper salts (e.g. copper acetate) are used instead of the copper complexes.

4 Claims, No Drawings

PROCESS FOR PREPARING HEAT AND LIGHT STABILIZED NYLON 66 POLYMER

This invention relates to an improved process for stabilizing nylon 66 polymer, poly(hexamethylene adipamide), against degradation caused by exposure of the polymer to heat and sun light.

Nylon 66 polymer is commercially prepared by heating an aqueous solution of nylon 66 salt (hexamethylene diammonium adipate) in a closed system (i.e. system closed to the atmosphere) under conditions of controlled time, temperature and pressure to remove water, effect polymerization of the salt and provide molten nylon 66 polymer which is then extruded into shaped articles such as fiber, film or molded articles. It is a conventional practice to stabiize the polymer against heat and light by the preliminary step of adding an effective amount of a copper salt (e.g. copper acetate) and KBr and/or KI to the aqueous nylon 66 salt solution. The copper salt forms copper ions and the KBr and/or KI complex(es) with the copper ions and inhibit(s) the copper ions from being reduced to metallic copper during the polymerization. The formation of metallic copper during polymerization causes processing difficulties and reduces the concentration of copper ions in the final polymer. Although the presence of the KI and/or KBr reduce(s) the formation of metallic copper, a significant amount of metallic copper is, nevertheless, still formed during polymerization utilizing conventional practices.

SUMMARY OF THE INVENTION

The present invention provides an improved process for incorporating copper ions, as a heat and light stabilizer, into nylon 66 polymer. The process comprises forming an aqueous solution comprising from 45 to 75% by weight of nylon 66 salt, sufficient KBr and/or KI to provide at least 500 (e.g. 500 to 2500) ppm by weight thereof in the final polymer to be formed and sufficient cupric ammino-hydroxide or cupric ammonium carbonate to provide at least 30 ppm (e.g. 30 to 125 ppm) and typically 50 to 100 by weight of copper in the final polymer to be formed and then heating the solution and polymerizing the nylon 66 salt in accordance with current commercial practices to provide molten nylon 66 polymer from which shaped articles, such as tire yarn, film and molded products, can be produced which contain copper ions and are stabilized against deterioration otherwise caused by exposure thereof to heat and/or sun light.

The process of the invention differs from prior art processes in that the polymerization is conducted in the presence of cupric ammino-hydroxide or cupric ammonium carbonate instead of a copper salt.

The following is a list of benefits gained by using the process of this invention:

(1) cupric ammino-hydroxide and cupric ammonium carbonate are relatively inexpensive sources of copper as compared to copper acetate monohydrate, a copper salt commonly incorporated into nylon 66 as a heat and light stabilizer, (2) cupric ammino-hydroxide and cupric ammonium carbonate are environmentally safe, (3) less metallic copper is formed, (4) less inert gas sweep is required to achieve the same molecular weight polymer and (5) cupric ammino-hydroxide and cupric ammonium carbonate do not form free radicals which can function as chain terminators during polymerization of the nylon 66 salt but rather form gaseous $CO_2$ and/or $NH_3$ which are removed from the polymerization mass along with steam.

DESCRIPTION OF THE PREFERRED EMBODIMENTS

Cupric ammino-hydroxide is a complex and may be represented by the formula $[Cu(NH_3)_n](OH)_2$, where n is 2, 4 or 6. The complex is soluble in water and may be formed by adding cupric hydroxide to an aqueous solution of $NH_4OH$ containing an excess of the stoichiometric amount of $NH_4OH$ needed to react with the copper hydroxide to form the complex. If a slight excess of $NH_4OH$ is present, $n=2$ and, as the excess of $NH_4OH$ increases, n increases from 2 to 4 to 6. Cupric ammonium carbonate is also a complex and may be formed, for example, by adding copper metal in the form of copper bars or powder to ammonium hydroxide or to an aqueous solution of ammonium carbonate in the presence of $O_2$ or $H_2O_2$. Although the complexes may be formed in situ in the aqueous nylon 66 salt solution, preferably, an aqueous solution thereof is added to the aqueous nylon 66 salt solution.

The process may be carried out in a continuous mode or a discontinuous (i.e. batch) mode. It is a conventional commercial practice to allow the molten nylon 66 to equilibrate for a period of time before it is extruded into shaped articles. During this time, polymerization continues to completion (equilibrium) with water being formed which is removed from the molten mass in the form of steam. In the continuous mode, reaching of equilibrium is facilitated by means of an inert gas sweep.

The following examples are given to further illustrate the invention.

EXAMPLE

This example illustrates the process of the present invention.

Two separate batches of molten nylon 66 polymer containing copper ions are prepared in an autoclave. The molten polymer of each batch is used to prepare 1260 denier/210 filament tire yarn. The following general procedure is used to prepare each batch.

An aqueous solution comprising 495 grams of KI, 265 kilograms of nylon 66 salt and 265 kilograms of water is added to an evaporator and heated under a pressure of 15 psig to a temperature of 137° C. to concentrated the solution to a salt concentration of 75%. The concentrated salt is transferred to an autoclave. Air is purged from the autoclave with nitrogen and the contents of the autoclave are heated to 220° C. while the pressure is permitted to increase to 250 psig by evaporation of water and is held at that pressure by venting steam to the atmosphere. The contents are then heated to 242° C. while holding the pressure at 250 psig. Then, the pressure is reduced to atmospheric pressure over a period of 40 minutes by venting steam to the atmosphere while the contents of the autoclave are heated to a temperature of 280° C. The molten polymer is held at a temperature of 280° C. for a period of 20 minutes to allow the molten polymer to equilibrate. The molten polymer is extruded from the bottom of the autoclave to form a ribbon that is chopped to flake. The flake is melted in a conventional melt spinning machine and extruded through a 210 hole-spinneret to provide a 6888 denier/210 filament as-spun yarn that is collected on a bobbin. The as-spun yarn is later drawn 5.467 times to provide a 1260 denier/210 filament tire yarn.

In making each batch of polymer 75 ppm of copper by weight of the theoretical amount of polymer to be formed is added initially to the aqueous nylon 66 salt solution. In making the first batch (Control), the copper is added as a 4% aqueous solution of copper acetate. In making the second batch (Test), the copper is added as an aqueous solution of cupric ammino-hydroxide formed by adding 2.0% copper hydroxide to a 29.7% aqueous solution of $NH_4$.

The tenacity, elongation and breaking strength of the Test yarn is comparable to that of the Control yarn. Also, no significant differences in the tenacity and skrinkage of the drawn yarns is observed. Analysis of the polymer of each batch, shows the polymer of the Test batch to have a slightly higher relative viscosity than the polymer of the Control batch. Analysis of the Test yarn and Control yarn shows that the Test yarn contained more copper than the Control yarn, indicating that during the preparation of the Test yarn less copper was lost than during the preparation of the Control yarn.

In two related experiments, 6880 denier 210 filament as-spun tire yarns are prepared by a conventional coupled melt-polymerization/melt-spinning process. The as-spun yarns are drawn in a separate operation to a denier of 1260. In these experiments, the aqueous solution comprised 50% by weight of nylon 66 salt and contained 83 ppm of copper and 924 ppm of KI each by weight of polymer to be formed. In one of the experiments, the copper is present in the aqueous solution in the form of copper acetate monohydrate (Control) and, in the other experiment, the copper is present in the aqueous solution in the form of cupric ammino-hydroxide (Test). In these experiments, the aqueous solution passes through an evaporator where it is heated to about 110° C. and concentrated to a nylon 66 salt concentration of 60% to 65% by weight. The solution is then passed through a reactor where water is removed. The pressure in the reactor is maintained at 250 psig and the temperature of the aqueous solution rises to about 235° C. The solution is then passed through a flash where the temperature rises to about 280° C. and the pressure is reduced to atmospheric pressure. The resulting molten polymer is held at atmospheric and 200° C. while being subjected to an inert nitrogen gas sweep to remove low molecular weight polymer. The polymer is then melt-spun into yarn. In the test experiment only 34 standard cubic feet per hour (SCFH) of inert gas sweep is required to provide 80 RV polymer, whereas in the control experiment, 61.4 SCFH of insert gas sweep is required to provide 80 RV polymer. This difference in gas sweep between Test (copper ammino hydroxide) and Control (copper acetate) represent substantial savings. The reduction in gas sweep indicated that less low molecular weight polymer is formed. There is no significant difference between the physical properties (tenacity and elongation) of the Test yarn and Control yarn.

What we claim is:

1. A process for incorporating copper ions into poly-(hexamethylene adipamide) polymer comprising:
   (a) forming an aqueous solution comprising KI and/or KBr, diammonium adipate salt and a copper complex selected from the group consisting of cupric ammino-hydroxide and cupric ammonium carbonate,
   (b) heating said solution in a system closed to the atmosphere under conditions of controlled time, temperature and pressure to remove water, effect polymerization of said salt and provide said polymer in the molten state, wherein said solution contains sufficient KI and/or KBr to provide at least 500 ppm by weight thereof in said polymer and sufficient copper complex to provide at least 30 ppm by weight of copper in said polymer.

2. The process of claim 1 wherein the concentration of said nylon 66 salt in said aqueous solutions is between 45% and 75%.

3. The process of claim 2 wherein said solution contains a sufficient amount of said copper complex to provide from 50 to 100 ppm by weight of copper in the final polymer.

4. The process of claim 3 wherein said copper complex is cupric ammino-hydroxide.

* * * * *